United States Patent
Kuo

(10) Patent No.: US 8,904,440 B2
(45) Date of Patent: Dec. 2, 2014

(54) APPARATUSES AND METHODS FOR FAVORITE PROGRAM RECOMMENDATIONS

(75) Inventor: Hsing-Ping Kuo, Taipei (TW)

(73) Assignee: Mitac International Corp., Taoyuan (TW)

( * ) Notice: Subject to any disclaimer, the term of this patent is extended or adjusted under 35 U.S.C. 154(b) by 348 days.

(21) Appl. No.: 12/965,130

(22) Filed: Dec. 10, 2010

(65) Prior Publication Data

US 2011/0258664 A1 Oct. 20, 2011

(30) Foreign Application Priority Data

Apr. 16, 2010 (TW) .............................. 99111927 A

(51) Int. Cl.
*H04N 5/445* (2011.01)
*H04N 21/466* (2011.01)
*H04N 21/442* (2011.01)
*H04N 21/8405* (2011.01)

(52) U.S. Cl.
CPC ..... *H04N 21/4668* (2013.01); *H04N 21/44204* (2013.01); *H04N 21/8405* (2013.01)
USPC .............................................. 725/46; 725/45

(58) Field of Classification Search
CPC .......... H04N 21/4668; H04N 21/4756; H04N 21/8405
USPC .................................................... 725/45–46
See application file for complete search history.

(56) References Cited

U.S. PATENT DOCUMENTS

| | | | | |
|---|---|---|---|---|
| 5,223,924 A | * | 6/1993 | Strubbe | 725/46 |
| 6,163,316 A | * | 12/2000 | Killian | 715/721 |
| 7,434,247 B2 | | 10/2008 | Dudkiewicz et al. | |
| 2005/0172318 A1 | * | 8/2005 | Dudkiewicz et al. | 725/46 |
| 2006/0037047 A1 | * | 2/2006 | DeYonker et al. | 725/58 |
| 2007/0044122 A1 | * | 2/2007 | Scholl et al. | 725/46 |
| 2008/0256578 A1 | * | 10/2008 | Narahara et al. | 725/45 |
| 2010/0162324 A1 | * | 6/2010 | Mehta et al. | 725/61 |
| 2011/0214147 A1 | * | 9/2011 | Kashyap et al. | 725/46 |

FOREIGN PATENT DOCUMENTS

| | | |
|---|---|---|
| CN | 1758727 A | 4/2006 |
| CN | 101083734 A | 12/2007 |
| TW | 435046 B | 5/2001 |
| WO | WO 2005/048587 A1 | 5/2005 |

* cited by examiner

*Primary Examiner* — Benjamin R Bruckart
*Assistant Examiner* — Carmine Malangone
(74) *Attorney, Agent, or Firm* — Birch, Stewart, Kolasch & Birch, LLP

(57) ABSTRACT

An apparatus for favorite program recommendations is provided. In the apparatus: a user interface module receives a channel indication signal indicating a TV channel; a tuner module receives a digital TV signal comprising current program information corresponding to the TV channel and program guide information; a processing unit analyzes at least one program keyword from the current program information to determine a current program type corresponding to a current program, and accumulates a favor weighting value of the current program type in a program weightings record which keeps a plurality of favor weighting values respectively corresponding to a plurality of program types. The processing unit also selects from the program guide information at least one recommended program according to at least one of the program types with the corresponding favor weighting value over a first predetermined threshold in the program weightings record, and generates a recommendation list.

8 Claims, 4 Drawing Sheets

☐ Cartoon : Doraemon, Nobi Nobita, YOYO TV, ...

☐ Sports : Basketball, Tennis, Golf, ...

APPARATUSES AND METHODS FOR FAVORITE PROGRAM RECOMMENDATIONS

CROSS REFERENCE TO RELATED APPLICATIONS

This application claims the benefit of Taiwan Patent Application No. 99111927, filed on Apr. 16, 2010, the entirety of which is incorporated by reference herein.

BACKGROUND OF THE INVENTION

1. Field of the Invention

The invention generally relates to favorite program recommendations, and more particularly, to automatic favorite program recommendations which keeps track of the viewing habits of users and accordingly generates a list of recommended programs.

2. Description of the Related Art

Analog TV signals may accumulate noises which can not be eliminated during the transmission and processing of signals. Unfortunately, the noises may cause the degression of signal quality and lower user satisfaction. In order to solve this problem, digital TV services are provided due to the advancement in video compression technology. For digital TV services, the analog TV signals are transformed into digital formats via sampling, quantification, encoding, modulation, and other digitalization processes. The current compression standard has been established by the Moving Picture Experts Group 2 (MPEG-2), wherein 1080 horizontal scan lines of High-Definition TV (HDTV) signals may be transmitted in the 6M frequency band used by conventional wireless TVs. The image pictures of the digital TVs possess finer and more photographic features than conventional analog TVs, and the digital TVs provide better audio effect as well.

Additionally, digital signals of digital TV services may include Electronic Program Guide/Electronic Service Guide (EPG/ESG) information other than the video and audio information. With this feature, users may conveniently retrieve the EPG/ESG information to improve TV watching experiences. However, digital TV systems or digital TV software generally just display(s) the received program list on a display for users to look up the programs for today or a few days in the future. It may be time consuming to search for a specific program from the entire program list, especially when there are a great number of TV channels in the program list. Moreover, it may be inconvenient for users to memorize the schedules of all the programs they are interested in. Thus, it is desirable to have an automatic method to keep track of the viewing habits of users and provide recommendations of programs that users may be interested in for reference, and for alleviating the burden of searching for programs from an entire program list.

BRIEF SUMMARY OF THE INVENTION

Accordingly, embodiments of the invention provide apparatuses and methods thereof for favorite program recommendations. In one aspect of the invention, an apparatus for favorite program recommendations is provided. The apparatus comprises a user interface module, a tuner module, and a processing unit. The user interface module receives a channel indication signal indicating a TV channel. The tuner module receives a digital TV signal comprising program guide information and current program information corresponding to the TV channel. The processing unit analyzes at least one program keyword from the current program information to determine a current program type corresponding to a current program, and accumulates a favor weighting value of the current program type in a program weightings record keeping a plurality of favor weighting values respectively corresponding to a plurality of program types. Also, the processing unit selects from the program guide information at least one recommended program according to at least one of the program types with the corresponding favor weighting value over a first predetermined threshold in the program weightings record, and generates a recommendation list.

In another aspect of the invention, a favorite program recommendations method for an apparatus comprising a tuner is provided. The favorite program recommendations method comprises the steps of receiving from a user a channel indication signal indicating a TV channel, receiving, via the tuner, a digital TV signal comprising program guide information and current program information corresponding to the TV channel, analyzing at least one program keyword from the current program information to determine a current program type corresponding to a current program, and accumulating a favor weighting value of the current program type in a program weightings record, wherein the program weightings record keeps a plurality of favor weighting values respectively corresponding to a plurality of program types. Subsequently, the favorite program recommendations method continues to perform the steps of selecting from the program guide information at least one recommended program according to at least one of the program types with the corresponding favor weighting value over a first predetermined threshold in the program weightings record, and generating a recommendation list to a display device.

Other aspects and features of the invention will become apparent to those with ordinary skill in the art upon review of the following descriptions of specific embodiments of the apparatuses and methods for favorite program recommendations.

BRIEF DESCRIPTION OF DRAWINGS

The invention can be more fully understood by reading the subsequent detailed description and examples with references made to the accompanying drawings, wherein:

FIG. 2 is a schematic diagram illustrating a keyword table according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
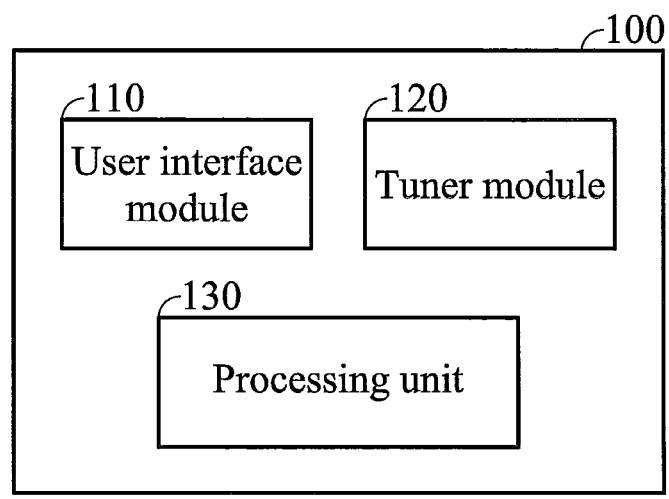
FIG. 1 is a block diagram illustrating the apparatus for favorite program recommendations according to an embodiment of the invention.

FIG. 1 is a block diagram illustrating the apparatus for favorite program recommendations according to an embodiment of the invention. In the apparatus 100, the user interface module 110 provides an operation interface for users to control the apparatus 100, and is mainly used to receive a channel indication signal from a user, wherein the channel indication signal indicates a TV channel that the user wants to watch. The user may generate the channel indication signal via a remote controller, or via a control button (not shown) disposed on the exterior of the apparatus 100. The apparatus 100 also comprises the tuner module 120 for receiving a combined digital signal for all TV channels and then fine tuning of the digital TV signal corresponding to the TV channel indicated in the channel indication signal. Generally, a digital TV signal includes video, audio, and data information. The data information comprises program guild information and current program information corresponding to the indicated TV channel, such as information concerning the title, subject matter, and channel of the current program. The program guild information may refer to EPG/ESG information which includes the program information from now to a few days in the future for users to look up.

In addition, the apparatus 100 comprises a processing unit 130, such as a general-purpose processor or a micro-control unit (MCU), or others, which loads and executes a series of program codes from a memory (not shown) or a storage device (not shown) to provide functionality of analyzing and recommending favorite programs to the user. To further clarify, after retrieving the digital TV signal corresponding to the indicated TV channel, the processing unit 130 analyzes the program keyword, such as "program_title=Doraemon", "program_subjectmatter=cartoon, Doraemon episode 7", "program_channel=YOYO TV", etc., from the current program information. The program type of the current program may be determined according to the analysis result. For example, the program types may cover predetermined types, such as "cartoon", "news", "sports", "drama", "cuisine", and "travel", etc. With the program type of the current program obtained from the analysis result, the processing unit 130 then accumulates in a program weightings record the favor weighting value of the program type. The program weightings record is used to keep track of the favor weighting value of each program type, wherein a high favor weighting value indicates that the corresponding program type is more favored by the user. At last, the processing unit 130 selects from the program guide information the programs according to at least one of the program types with the corresponding favor weighting value over a predetermined threshold in the program weightings record, and generates a recommendation list with the selected programs. Specifically, the recommendation list may include the programs in the following hours or even days, which the user may be interested in. Also, the recommendation list may include other information of the listed programs, such as the corresponding TV channels, program titles, program schedules, subject matters, program types, etc.

Regarding the analyzing and recommending of favorite programs to the user, the processing unit 130 may be alternatively configured to analyze the program keywords from the current program information to determine the current program type of the current program and to store a viewing record of the current program type in a storage unit (not shown) for noting the related information of the current program type, including the viewing time, the program title, the program subject matter, and program channel, etc. Take "YOYO TV" as the currently viewing channel for example. The current program type may be determined to be "cartoon" according to the program keywords of the current program, and a corresponding viewing record may be generated and stored in a memory or other storage unit. The analysis procedure is repeatedly performed for each viewed program. When a recommendation request is received from user via user interface module 110, the processing unit 130 then accumulates in a program weightings record a favor weighting value of the current program type according to the viewing record of the current program type stored in a past period of time. Specifically, a respective favor weighting value is accumulated for each program type from the viewing records stored in the memory. The past period of time may be configured to be a predetermined number of days or months in the past from now. For example, the user may set the period of time to be the past 3 months from now and the viewing records generated in the past 3 months are taken into account for the accumulation of the favor weighting value. Based on the favor weighting values accumulated in the program weightings record, the processing unit 130 selects from the program weightings record the program types whose favor weighting values are over a predetermined threshold, and further selects the programs of the selected program types to generate a recommendation list. Take "cartoon" as the selected program type with favor weighting value over the predetermined threshold for example. The "cartoon" program type is selected after analyzing the viewing records in a past period of time and determining that the favor weighting value of the "cartoon" program type is over the predetermined threshold for example. The processing unit 130 then selects the programs belonging to the "cartoon" program type in the following hours or even days, which the user may be interested in. Lastly, the recommendation list is generated according to the selected programs.

In one embodiment, the processing unit 130 stores a plurality of keywords for each of the predetermined program types in a keyword table, and the program type of the current program is determined by comparing the keywords in the keyword table with the program keyword analyzed from the current program information. As shown in FIG. 2, the keyword table may separately store the keywords of different program types. Taking the program with title "Doraemon" as an example, it may be determined by keyword comparison as described above that the keywords of the program appear in the program type "cartoon", and thus, the program type of the program is determined as "cartoon". The apparatus 100 may additionally include a keyword database (not shown) to implement the logical concept of the keyword table by using the data management functions embedded therein.

The program type analysis may be performed alternatively in addition to the described fashion. In another embodiment, the apparatus 100 may include a program sorting rule database (not shown) for storing the user-defined program sorting rules, such as a program sorting rule for classifying the programs with keywords relating to sports and not news as "sports" type, or a program sorting rule for classifying all of the programs of the StarMovie channel as "drama" type. A user may employ a structural logic syntax (e.g. the lookup instruction formats in MySQL or SQL) to specify the program sorting rules, and store the specified program sorting rules in the program sorting rule database via the user interface module 110, so that the processing unit 130 may perform the program type analysis according to the specified program sorting rules.

Since the program type analysis and the favor weighting value accumulation are performed for the programs that users are interested in, the program type analysis and the favor weighting value accumulation may be designed to be performed only when the accumulated viewing time exceeds a predetermined threshold of time, to avoid situations where the user just switches the TV channels and not really watches a program of a certain TV channel. That is, the processing unit 130 may further count the time the tuner module 110 tunes in to a certain TV channel (or may be referred to as the continuous viewing time corresponding to the current program of the certain TV channel), and performs the program type analysis and the favor weighting value accumulation only when the accumulated viewing time exceeds the predetermined threshold of time. For example, the predetermined threshold of time may be ¼ or ⅓ of the duration of the current program.

Figure 3:
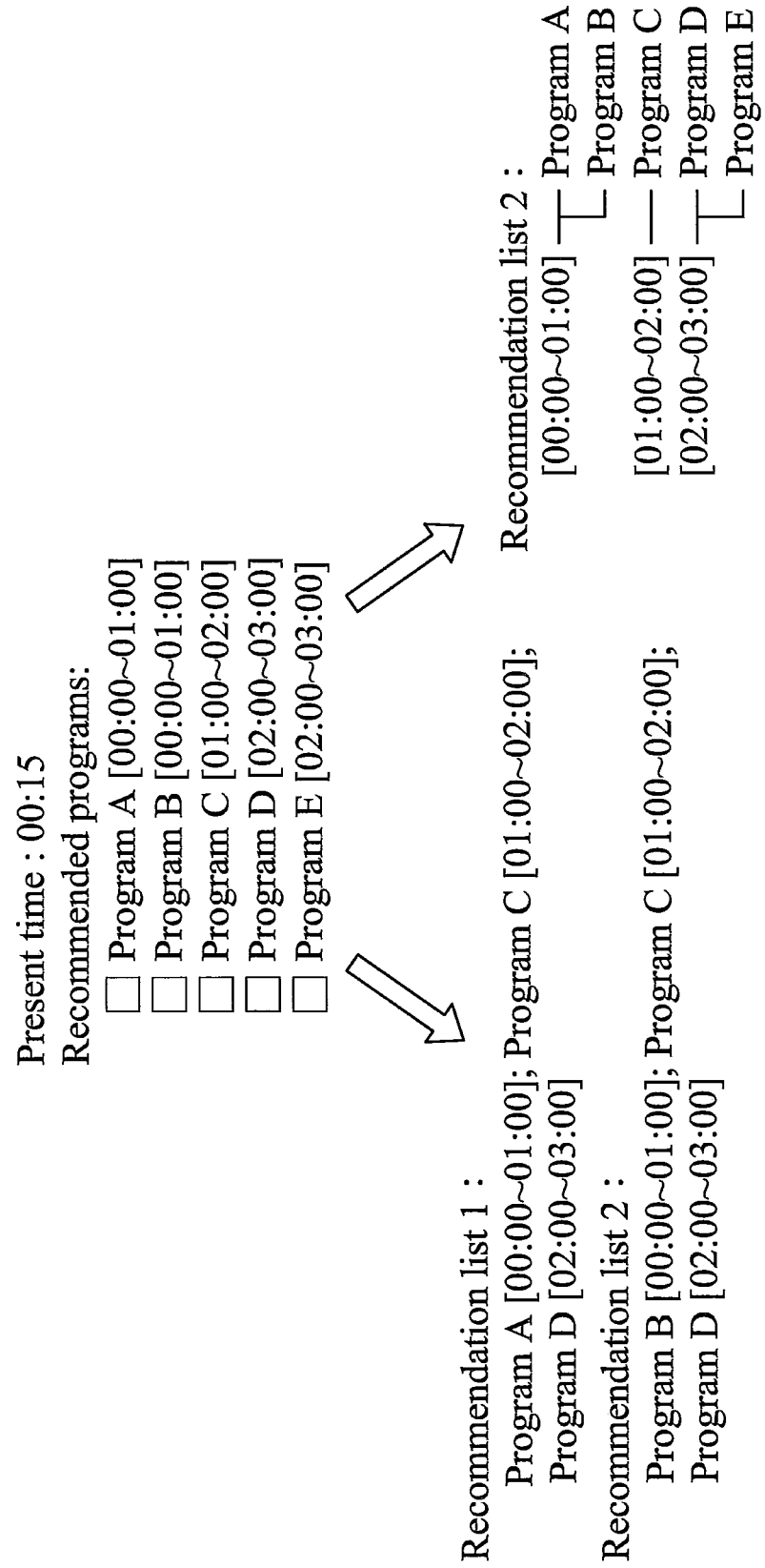
FIG. 3 is a schematic diagram illustrating the favorite program recommendations method according to an embodiment of the invention.

Lastly, before outputting the recommendation list, the processing unit 130 may sort the selected programs in an order of time according to the program schedules of the selected programs, so that the user may conveniently browse the recommendation list based on the present time and choose the program he/she wants to watch. In addition, when more than one program in the same period of time is selected, the processing unit 130 may generate multiple recommendation lists based on the first set (in the order of time) of selected programs of overlapping program schedules. Alternatively, the processing unit 130 may generate multiple recommendation lists based on a second or latter set (in the order of time) of selected programs which have overlapping program schedules, wherein the programs in each of the recommendation lists are sorted according to the corresponding favor weighting values in the program weightings record. If no program in the recommendation lists corresponds to the program types that have higher favor weighting values, the processing unit 130 may randomly select from the programs in the recommendation list to be sorted. FIG. 3 is a schematic diagram illustrating the sorting of recommended programs according to an embodiment of the invention. In this embodiment, the present time is assumed to be "00:15", and the selected programs are as follows: program A [00:00~01:00], program B [00:00~01:00], program C [01:00~02:00], program D [02:00~03:00], program E [02:00~03:00]. Since the program schedules of programs A and B overlap, the favorite program recommendations method may generate 2 different recommendation lists according to program A and program B, as shown in the lower left side of FIG. 3, or the favorite program recommendations method may generate another recommendation list with all selected programs displayed in the order of time, as shown in the lower right side of FIG. 3.

In one embodiment, the apparatus 100 may further include a player engine module (not shown) for processing the digital TV signals received by the tuner module 120. The player engine module may comprise a demodulator (not shown), video processor (not shown), and an audio processor (not shown). The tuner module 120 may perform down-conversion and mix on the received digital TV signals. The demodulator demodulates the down-converted and mixed digital TV signals, and then forwards the demodulated signals to the video processor and the audio processor for processing the video and audio related signals therein. The apparatus 100 may further include a display device (not shown) and a speaker (not shown) for receiving the video and audio signals from the video processor and audio processor, and output visual images and sounds accordingly. The display device may receive the recommendation list from the processing unit 130 and display it to the user. In another embodiment, the display device and the speaker may be stand-alone devices, and coupled to the apparatus 100 via connectors or air interfaces for receiving of the video and audio signals. Note that the demodulator, video processor, audio processor, display device, and speaker are well-known components to those skilled in the art and are beyond the scope of the invention, so related descriptions are omitted herein.

Figure 4:
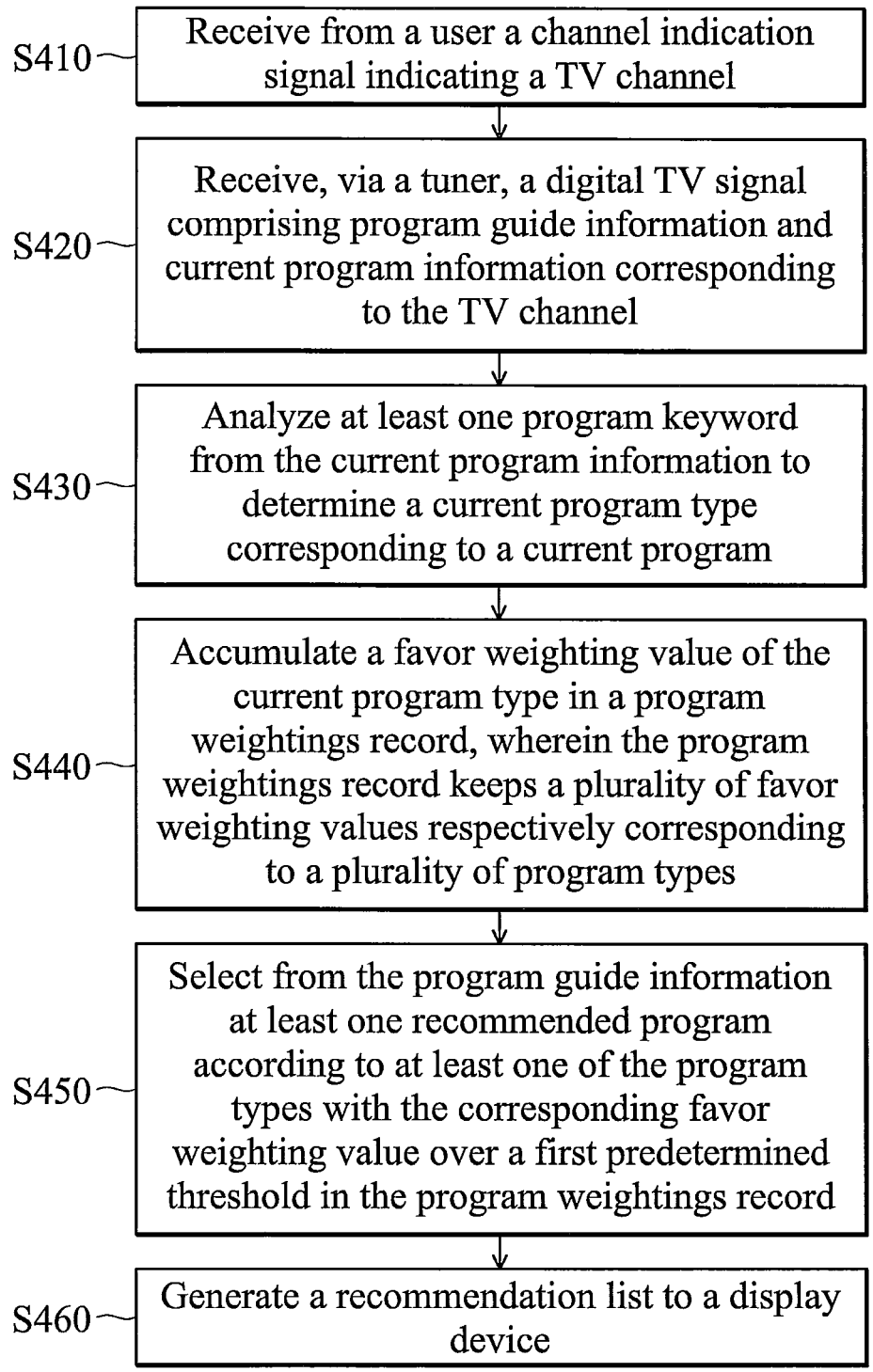
FIG. 4 is a flow chart illustrating the favorite program recommendations method according to an embodiment of the invention.

FIG. 4 is a flow chart illustrating the favorite program recommendations method according to an embodiment of the invention. In this embodiment, the favorite program recommendations method is applied to the apparatus 100 as described above. To begin, the user interface module 100 receives a channel indication signal indicating a TV channel (step S410). The indicated TV channel in the channel indication signal is the TV channel that the user wants to watch. The user may generate the channel indication signal via a remote controller, or via a control button disposed on the exterior of the apparatus 100. Subsequently, the apparatus 100 receives a digital TV signal via the tuner module 120 (step S420). The digital TV signal comprises program guide information and current program information corresponding to the indicated TV channel, wherein the program guide information may refer to EPG/ESG information which includes the program information from now to a few days in the future for users to look up, and the current program information comprises the title, subject matter, and channel of the current program. After receiving the digital TV signal, the processing unit 130 in the apparatus 100 analyzes at least one program keyword from the current program information to determine a current program type corresponding to the current program (step S430). To further clarify, in step S430, the current program type is determined by comparing the keywords in the keyword table with the program keyword from the current program information. The keyword table is used to store a plurality of keywords for each of the predetermined program types. Next, the processing unit 130 in the apparatus 100 accumulates a favor weighting value of the current program type in a program weightings record (step S440). The program weightings record is used to keep a plurality of favor weighting values respectively corresponding to a plurality of the predetermined program types, wherein a high favor weighting value indicates that the corresponding program type is more favored by the user. The processing unit 130 in the apparatus 100 selects from the program guide information at least one recommended program according to at least one of the program types with the corresponding favor weighting value over a predetermined threshold in the program weightings record (step S450), and generates a recommendation list to a display device (step S460).

In one embodiment, during the step S430, a viewing record of the current program type may be generated and stored in a memory or storage unit for noting the related information of the current program type, including the viewing time, the program title, the program subject matter, and program channel, etc. Later in the step S440, the processing unit 130 accumulates in a program weightings record a favor weighting value of the current program type according to the viewing record of the current program type stored in a past period of time, when receiving a recommendation request from user via user interface module 110. The past period of time may be predetermined by user to be a specific number of days or months in the past from now, so that only the viewing records generated and stored in the predetermined period of time are taken into account for the accumulation of the favor weighting value. In another embodiment, the step S430 may be performed to determine the current program type according to a user-defined program sorting rule instead, to increase the flexibility of program type analysis. In addition, the favorite program recommendations method may further count the continuous viewing time corresponding to the current program, and the program type analysis (i.e. the step S430) and the favor weighting value accumulation (i.e. the step S440) are only performed when the continuous viewing time exceeds a predetermined threshold of time, to avoid the situations where the user just switches the TV channels and not really watches a program of a certain TV channel. In another embodiment, the step S460 may be performed to sort the at least one recommended program in an order of time according to at least one program schedule of the at least one recommended program, and generates the recommendation list according to the sorted recommended program, so that the user may conveniently browse the recommendation list based on the present time and choose the program he/she wants to watch. It is noted that the favorite program recommendations method may be applied to other digital TV signal processing devices, such as digital TV set-up-boxes, digital TV tuners, and other devices that are separate from display devices, or a digital TV with built-in digital TV signal processing functions.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. An apparatus for favorite program recommendations, comprising:
   a user interface module, executed by a processing unit and a memory, receiving a channel indication signal indicating a TV channel;
   a tuner receiving a digital TV signal comprising program guide information and current program information corresponding to the TV channel;
   said processing unit analyzing at least one program keyword from the current program information to determine a current program type corresponding to a current program, accumulating a favor weighting value of the current program type in a program weightings record keeping a plurality of favor weighting values respectively corresponding to a plurality of program types, selecting from the program guide information at least two recommended programs according to at least one of the program types with the corresponding favor weighting value over a first predetermined threshold in the program weightings record, sorting at least two of the recommended programs by their corresponding program schedules, and when at least two of the sorted recommendation programs have overlapping program schedules, generating a plurality of recommendation lists according to at least two of the sorted recommended programs with the corresponding favor weighting values over the first predetermined threshold, wherein the recommendation programs that have overlapping program schedules are in different recommendation lists,
   wherein the processing unit further counts a continuous viewing time corresponding to the current program, and performs the analyzing of the at least one program keyword and the accumulating of the favor weighting value only when the continuous viewing time exceeds a second predetermined threshold, and
   wherein the processing unit further stores a plurality of keywords for each of the program types in a keyword table, and the current program type is determined by comparing the keywords in the keyword table with the at least one program keyword from the current program information, and the processing unit is further configured to analyze the program keywords from the current program information to determine the current program type in the memory according to a pre-stored specified sorting rules for classifying the programs defined by a user or by a keyword database.

2. The apparatus of claim 1, wherein, when the sorted recommendation programs do not have overlapping program schedules, the processing unit further generates one recommendation list according to at least two of the recommended programs corresponding to a current or forthcoming period of time, and when at least two of the sorted recommendation programs have overlapping program schedules, the recommendation lists are generated according to at least two of the recommended programs each corresponding to the current or forthcoming period of time.

3. The apparatus of claim 1, wherein, when the sorted recommendation programs do not have overlapping program schedules, the processing unit further generates one recommendation list according to at least two of the sorted recommended programs with the corresponding favor weighting values over the first predetermined threshold.

4. A favorite program recommendations method for an apparatus comprising a tuner, comprising:
   receiving from a user a channel indication signal indicating a TV channel;
   receiving, via the tuner, a digital TV signal comprising program guide information and current program information corresponding to the TV channel;
   analyzing at least one program keyword from the current program information to determine a current program type corresponding to a current program;
   accumulating a favor weighting value of the current program type in a program weightings record, wherein the program weightings record keeps a plurality of favor weighting values respectively corresponding to a plurality of program types;
   selecting from the program guide information at least two recommended programs according to at least one of the program types with the corresponding favor weighting value over a first predetermined threshold in the program weightings record;
   sorting at least two of the recommended programs by their corresponding program schedules;
   generating a plurality of recommendation lists to a display device according to at least two of the sorted recommended programs with the corresponding favor weighting values over the first predetermined threshold, when at least two of the sorted recommended programs have overlapping program schedules, wherein the recommendation programs that have overlapping program schedules are in different recommendation lists;
   counting a continuous viewing time corresponding to the current program, wherein the analyzing of the at least one program keyword and the accumulating of the favor weighting are only performed when the continuous viewing time exceeds a second predetermined threshold;
   storing a plurality of keywords for each of the program types in a keyword table, wherein the current program type is determined by comparing the keywords in the keyword table with the at least one program keyword from the current program information; and
   analyzing the program keywords from the current program information to determine the current program type in a memory according to a pre-stored specified sorting rules for classifying the programs defined by a user or by a keyword database.

5. The favorite program recommendations method of claim 4, further comprising: when the recommended programs do not have overlapping program schedules, generating one recommendation list according to at least two of the sorted recommended programs corresponding to a current or forthcoming period of time, wherein when at least two of the recommended programs have overlapping program schedules, the recommendation lists are generated according to at least two of the sorted recommended programs corresponding to the current or forthcoming period of time.

6. The favorite program recommendations method of claim 4, further comprising: when the recommended programs do not have overlapping program schedules, generating one recommendation according to at least two of the sorted recommended programs with the corresponding favor weighting values over the first predetermined threshold.

7. An apparatus for favorite program recommendations, comprising:
- a user interface module, executed by a processing unit and a memory, receiving a channel indication signal indicating a TV channel;
- a tuner receiving a digital TV signal comprising program guide information and current program information corresponding to the TV channel; and
- said processing unit analyzing at least one program keyword from the current program information to determine a current program type corresponding to a current program and storing a viewing record of the current program type in a storage unit, and accumulating in a program weightings record a favor weighting value for the current program type according to the viewing record stored in a past period of time,
- wherein the program weightings record keeps a plurality of favor weighting values respectively corresponding to a plurality of program types, and
- wherein the processing unit further selects from the program guide information at least two recommended programs according to at least one of the program types with the corresponding favor weighting value over a first predetermined threshold, sorts at least two of the recommended programs by their corresponding program schedules, and when at least two of the sorted recommended programs have overlapping program schedules, generates a plurality of recommendation lists according to at least two of the sorted recommended programs with the corresponding favor weighting values over the first predetermined threshold, wherein the recommendation programs that have overlapping program schedules are in different recommendation lists,
- wherein the processing unit further counts a continuous viewing time corresponding to the current program, and performs the analyzing of the at least one program keyword and the accumulating of the favor weighting value only when the continuous viewing time exceeds a second predetermined threshold, and
- wherein the processing unit further stores a plurality of keywords for each of the program types in a keyword table, and the current program type is determined by comparing the keywords in the keyword table with the at least one program keyword from the current program information, and the processing unit is further configured to analyze the program keywords from the current program information to determine the current program type in the memory according to a pre-stored specified sorting rules for classifying the programs defined by a user or by a keyword database.

8. The apparatus of claim 7, wherein, when the recommended programs do not have overlapping program schedules, the processing unit further generates one recommendation list according to at least two of the sorted recommended programs corresponding to a current or forthcoming period of time.

* * * * *